(12) United States Patent
Kobayashi et al.

(10) Patent No.: US 10,754,164 B2
(45) Date of Patent: Aug. 25, 2020

(54) IMAGE READING APPARATUS AND READING MODULE

(71) Applicant: SEIKO EPSON CORPORATION, Tokyo (JP)

(72) Inventors: Hidekazu Kobayashi, Hara-mura (JP); Hidemitsu Sorimachi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 16/038,831

(22) Filed: Jul. 18, 2018

(65) Prior Publication Data

US 2019/0025598 A1 Jan. 24, 2019

(30) Foreign Application Priority Data

Jul. 21, 2017 (JP) .................. 2017-141968

(51) Int. Cl.
*G02B 27/02* (2006.01)
*H04N 1/387* (2006.01)
*G06T 1/00* (2006.01)
*H04N 9/31* (2006.01)
*H04N 1/195* (2006.01)
*H04N 5/225* (2006.01)
(Continued)

(52) U.S. Cl.
CPC .......... *G02B 27/021* (2013.01); *G06T 1/0007* (2013.01); *H04N 1/195* (2013.01); *H04N 1/387* (2013.01); *H04N 1/401* (2013.01); *H04N 1/48* (2013.01); *H04N 1/6094* (2013.01); *H04N 5/2251* (2013.01); *H04N 9/3185* (2013.01); *H04N 5/2256* (2013.01)

(58) Field of Classification Search
CPC .... G02B 27/021; G06T 1/0007; H04N 1/195; H04N 1/387; H04N 1/401; H04N 1/48; H04N 1/6094; H04N 5/2251; H04N 5/2256; H04N 9/3185
See application file for complete search history.

(56) References Cited

U.S. PATENT DOCUMENTS 6,036,095 A * 3/2000 Seo .................. G06K 7/10584
235/454
2004/0109615 A1 6/2004 Nakamura
(Continued)

FOREIGN PATENT DOCUMENTS

JP 07-074900 A 3/1995
JP 2001-094728 A 4/2001
(Continued)

*Primary Examiner* — Zhitong Chen
(74) *Attorney, Agent, or Firm* — Workman Nydegger

(57) ABSTRACT

An image reading apparatus includes a reading module. The reading module includes a linear light source that extends in a direction intersecting a moving direction in which the transport unit relatively moves and irradiates a document with light via a transparent member, an image forming element that condenses the light reflected from the document, and a light receiving element that receives the light condensed by the image forming element. The linear light source is disposed such that a main optical axis of the linear light source is inclined at a first angle with respect to a normal direction of the transparent member in the moving direction, and the image forming element is inclined at a second angle in the same direction as the inclination of the main optical axis of the linear light source.

9 Claims, 10 Drawing Sheets

(51) Int. Cl.
*H04N 1/48* (2006.01)
*H04N 1/60* (2006.01)
*H04N 1/401* (2006.01)

(56) References Cited

U.S. PATENT DOCUMENTS

| | | | |
|---|---|---|---|
| 2005/0207671 A1 | 9/2005 | Saito | |
| 2009/0153674 A1 | 6/2009 | Takabatake et al. | |
| 2012/0076512 A1* | 3/2012 | Aoyagi | G03G 15/5029 |
| | | | 399/16 |
| 2015/0290956 A1* | 10/2015 | Igarashi | B41J 11/009 |
| | | | 347/16 |
| 2016/0277624 A1* | 9/2016 | Osanai | H04N 1/0423 |

FOREIGN PATENT DOCUMENTS

| | | |
|---|---|---|
| JP | 2004-187111 A | 7/2004 |
| JP | 2004-320123 A | 11/2004 |
| JP | 2007-214944 A | 8/2007 |
| JP | 2009-147842 A | 7/2009 |
| JP | 2015-091030 A | 5/2015 |

\* cited by examiner

IMAGE READING APPARATUS AND READING MODULE

INCORPORATED BY REFERENCE

The entire disclosure of Japanese Patent Application No. 2017-141968, filed Jul. 21, 2017 is expressly incorporated by reference herein.

BACKGROUND

1. Technical Field

The present disclosure relates to an image reading apparatus for reading an image of a document by a reading module moving relatively with the document and the reading module.

2. Related Art

In the related art, as an example of an image reading apparatus, a scanner device (for example, multi-function peripheral) provided with a light source (example of linear light source) for reading a document on a glass plate (example of transparent member) from below a document placing table, a lens array (example of image forming element), a carriage including a reading module with a sensor (example of light receiving element) is known (for example, JP-A-2007-214944). This type of image reading apparatus reads an image of a document on the document placing table by a reading module by moving the carriage in a sub scanning direction intersecting with a main scanning direction that is a longitudinal direction of a reading element.

The reading module reads an image on the document by receiving reflected light obtained by irradiating a document surface with the light from the linear light source by the reading element. In the disposition of the linear light source and the image forming element, the linear light source is disposed at an attitude angle capable of projecting light in an oblique direction with respect to a reading surface of a document, and the image forming element is disposed such that the optical axis thereof is directed to the same direction (normal direction) parallel to a normal line of the document surface.

In a case where the document is a glossy paper or a semi-glossy paper (hereinafter, these papers are collectively referred to as glossy medium), a regularly reflected light from the reading surface of the document does not enter the image forming element, and an excessively bright Gaussian scattering region is relatively largely distributed around the regularly reflected light depending on reflection characteristics. In a case where this type of excessively bright Gaussian scattered reflected light enters the image forming element, contrast will be greatly reduced. Moreover, the linearity of gradation may collapse and even wrinkles on the document may be erroneously read as image unevenness in some cases. In this way, in a case where the document is a glossy medium, there is a problem that an image quality of a read image deteriorates.

For example, in JP-A-2004-187111, a material representation device including a document placing table for placing a material to be an object and imaging means for imaging the material placed on the document placing table, in which an imaging element of the imaging means and an optical system are integrally constituted, and this imaging means is offset from a central portion of the document placing table and disposed above the document placing table is disclosed. According to this technique, since the light irradiated from a light source offset and juxtaposed from the central portion of document placing table with the imaging means hits on the material on the document placing table and is regularly reflected in a direction opposite to the offset direction, this regularly reflected light does not directly enter the optical system of the imaging means. For this reason, even in a case where a glossy document is used as a material, deterioration (halation and the like) of an image due to reflection of the regularly reflected light from the light source is prevented, and an accurate image can be obtained.

However, in a scanner device, since a linear reading module is configured to move relatively in the sub scanning direction with respect to a document to read the document, it is impossible to dispose the reading module at a predetermined position offset from the central portion of the document placing table as in the material representation device described in JP-A-2004-187111. Moreover, in JP-A-2004-187111, it is possible to prevent the regularly reflected light from entering the imaging means. However, deterioration in image quality of a read image due to an entrance of relatively widely distributed excessively bright Gaussian scattered reflected light in the case of a glossy medium is not taken into a consideration. In the case of the material representation device, entrance of the Gaussian scattered reflected light can be avoided if a user adjusts a position and an angle of a camera and a light source while watching the image of an object such as a material. However, such kind of adjustment by a user is not structurally possible in the scanner device. For this reason, in the scanner device, in a case where the document is a glossy medium, the Gaussian scattered reflected light enters the image forming element, and it is desired to solve a problem that image quality of a read image is deteriorated due to at least one of reduction in contrast and deterioration in linearity of gradation.

SUMMARY

An advantage of some aspects of the disclosure is to provide an image reading apparatus and a reading module that can suppress excessively bright inappropriate scattered reflected light disposed around the regularly reflected light from a reading surface of a document from entering an image forming element, even in a case where the document is a glossy medium, and suppress deterioration in image quality of the read image.

Hereinafter, means of the disclosure and operation effects thereof will be described.

According to an aspect of the disclosure, there is provided an image reading apparatus including: a transparent member that defines a position of a document; a reading module that is disposed on an opposite side of the document with respect to the transparent member; and a transport unit that relatively moves the document and the reading module. The reading module includes a linear light source that extends in a direction intersecting a moving direction in which the transport unit relatively moves and irradiates the document with light via the transparent member, an image forming element that is disposed along an extending direction of the linear light source and condenses light reflected from the document, and a light receiving element that is disposed along an extending direction of the image forming element and receives the light condensed by the image forming element. The linear light source is disposed such that a main optical axis of the linear light source is inclined at a first angle with respect to a normal direction of the transparent member in the moving direction, and the image forming element is disposed such that an optical axis of the image forming element is directed to a position where a light reflected from a reading position of the document is emitted from the transparent member, and is inclined at a second angle in the same direction as the inclination of the main optical axis of the linear light source with respect to the normal direction.

According to this configuration, since the optical axis of the image forming element is inclined at the second angle in the same direction as the inclination of the main optical axis of the linear light source with respect to the normal direction of the transparent member, the image forming element can suppress the entrance of the inappropriate scattered reflected light compared to a configuration that the optical axis of the image forming element is not inclined with respect to the normal direction of the transparent member. In other words, the image forming element can avoid the entrance of the Gaussian scattered reflected light, and allow the entrance of the Lambert scattered reflected light as much as possible. For this reason, even though the document is a glossy medium, an image with appropriate brightness can be formed on the light receiving element. Accordingly, even though the document is a glossy medium, it is possible to suppress the excessively bright inappropriate scattered reflected light distributed around the regularly reflected light from the document surface from entering the image forming element regardless of reflection characteristics and thereby, deterioration in image quality of the read image can be suppressed.

In the image reading apparatus, it is preferable that the second angle be smaller than the first angle.

According to this configuration, since the second angle is smaller than the first angle, an appropriate amount of received light and depth of focus can be secured in spite of inclining the image forming element with respect to the normal direction. For this reason, even in a case where the document is a glossy medium, an image with appropriate brightness can be formed on the light receiving element, and deterioration in image quality of the read image can be suppressed.

In the image reading apparatus, it is preferable that the reading module include a housing that accommodates the linear light source, the image forming element, and the light receiving element, the housing have a facing surface that faces the transparent member, and the optical axis of the image forming element be inclined at the second angle from a normal direction of the facing surface.

According to this configuration, an appropriate scattered reflected light (for example, Lambert scattered reflected light) can enter the image forming element with a relatively simple configuration of disposing the image forming element in an attitude inclined with respect to the housing such that the optical axis of the image forming element in the housing is inclined at the second angle from the normal direction of the facing surface of the housing.

In the image reading apparatus, it is preferable that the reading module include a housing that accommodates the linear light source, the image forming element, and the light receiving element, the housing have a facing surface that faces the transparent member, and the optical axis of the image forming element be disposed along a normal direction of the facing surface.

According to this configuration, the optical axis of the image forming element is disposed along the normal direction of the facing surface of the housing. In other words, the optical axis of the image forming element is inclined with respect to the normal direction of the transparent member by inclining the housing with respect to the normal direction. By inclining the housing as a whole, even in a case where the document is a glossy medium, it is possible to suppress the excessively bright inappropriate scattered reflected light distributed around the regularly reflected light from the reading surface of the document from entering the image forming element and thereby, deterioration in image quality of the read image can be suppressed.

In the image reading apparatus, it is preferable that, in a case where the document is a glossy medium, the second angle be set to an angle at which the image forming element receives scattered reflected light from a Lambert scattering region by avoiding a scattered reflected light from a Gaussian scattering region in the reflected light from the document.

According to this configuration, since the reading module reads an image of the Lambert scattered reflected light by avoiding the Gaussian scattered reflected light, even in a case where the document is a glossy medium, deterioration in image quality of the read image can be suppressed.

In the image reading apparatus, it is preferable that the image reading apparatus further include a medium type acquisition unit that acquires a medium type of the document, and the second angle is changed according to the medium type.

According to this configuration, since the second angle changes according to the medium type acquired by the medium type acquisition unit, in a case where the document is a glossy medium, deterioration in image quality of the read image can be suppressed, and in a case where the document is a non-glossy medium, the brightness of the incident light (amount of received light) due to the inclination of the image forming element and decrease in resolution due to floating of a document can be suppressed.

In the image reading apparatus, it is preferable that the medium type acquisition unit acquire the medium type from any one of acquiring the medium type based on medium type information input through an input unit, determining the medium type based on a reflection state of the document detected by a dedicated sensor, or determining the medium type based on a reflection state of the document detected by the reading module.

According to this configuration, the medium type of the document can be acquired by a relatively simple method.

According to another aspect of the disclosure, there is provided a reading module including: a linear light source that extends in a predetermined direction and irradiates a document with light; an image forming element that is disposed along an extending direction of the linear light source, and condenses light reflected from the document; a light receiving element that is disposed along an extending direction of the image forming element, and receives the light condensed by the image forming element; and a housing that has a facing surface that faces the document, and accommodates the linear light source, the image forming element and the light receiving element. The linear light source is disposed such that a main optical axis of the linear light source is inclined at a first angle with respect to a normal direction of the facing surface in the predetermined direction, and the image forming element is disposed such that an optical axis of the image forming element is inclined at a second angle in the same direction as the inclination of the main optical axis of the linear light source with respect to the facing surface. According to this configuration, the same operation effects as those of the above-described image reading apparatus can be obtained.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

First Embodiment

Hereinafter, a first embodiment embodying an image reading apparatus will be described with a reference to the drawings. The image reading apparatus according to the first embodiment is, for example, a multi-function peripheral provided with a scanner device.

Figure 1:
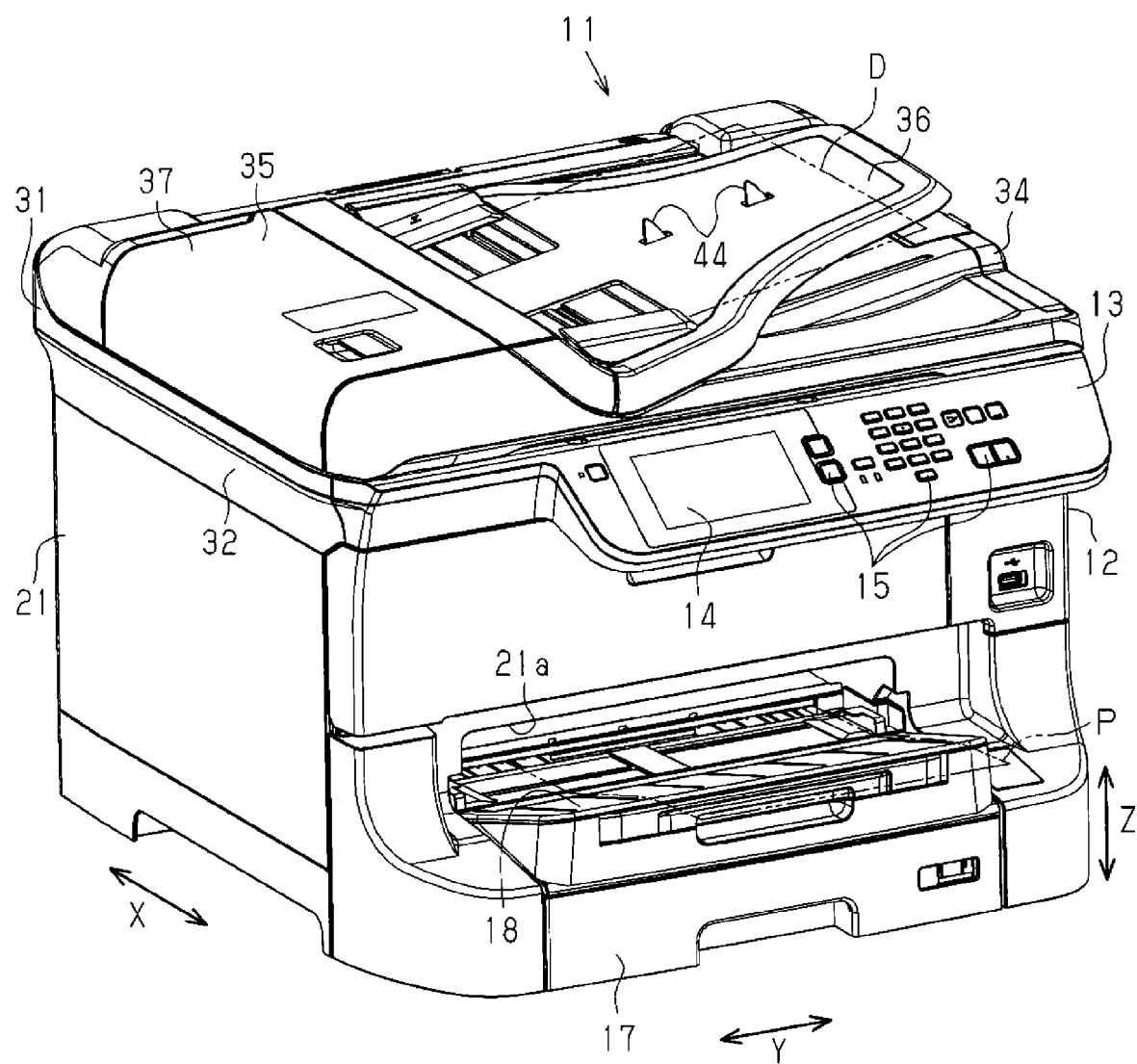
FIG. 1 is a perspective view illustrating a multi-function peripheral according to a first embodiment.

As illustrated in FIG. 1, a multi-function peripheral 11 includes a printing device 21 for performing printing on a medium P such as a sheet, and a scanner device 31 that is disposed on the upper side of the printing device 21 in a vertical direction Z and can read a document D. The multi-function peripheral 11 has functions of scanning, copying and printing.

An operation panel 13 provided in a device main body 12 of the multi-function peripheral 11 includes a display 14 for displaying a menu screen and the like and an operation unit 15 including operation switches and the like. For example, by operating the operation unit 15, requests for scanning, copying, and printing are given to the multi-function peripheral 11. Requests for scanning and printing is given to the multi-function peripheral 11 from a host device 200 (see FIG. 8) including a personal computer (PC) connected to the multi-function peripheral 11 through a communication cable. The multi-function peripheral 11 receives, for example, a scan job at the time of requesting scanning and copying.

The printing device 21 performs printing on a medium P supplied (fed) from a cassette 17 inserted in a lower portion of the device main body 12. The medium P on which printing is performed is discharged from a discharge port 21a of the device main body 12 onto a stacker 18. The scanner device 31 reads the document D, and the read image data is transferred to the host device 200, for example. Copying is performed by the printing device 21 printing an image based on image data of the document D read by the scanner device 31 on the medium P. For this reason, reading of the document D by the scanner device 31 is performed when scanning and copying are performed.

As illustrated in FIG. 1, the scanner device 31 includes a main body 32 that has a flatbed type document placing table 33 (see FIG. 2) on which a document can be placed on an upper portion thereof, and a document placing table cover 34 openable/closable with respect to the document placing table 33. In the present example, on a rear surface portion of the document placing table cover 34 (upper side in FIG. 1), an auto document feeder 35 (ADF), (hereinafter, also simply referred to as "document transport unit 35") is equipped. The document transport unit 35 includes a set tray 36 on which a plurality of the documents D can be set, and a transport mechanism 37 that transports the document D on the set tray 36 one by one. The transport mechanism 37 performs transporting including feeding for sending the document on the set tray 36 to a reading position, and discharging for sending out the document D after an image thereon is read. After reading the image on the document D, the document D is discharged to, for example, a discharge area between the set tray 36 and the document placing table cover 34.

Figure 2:
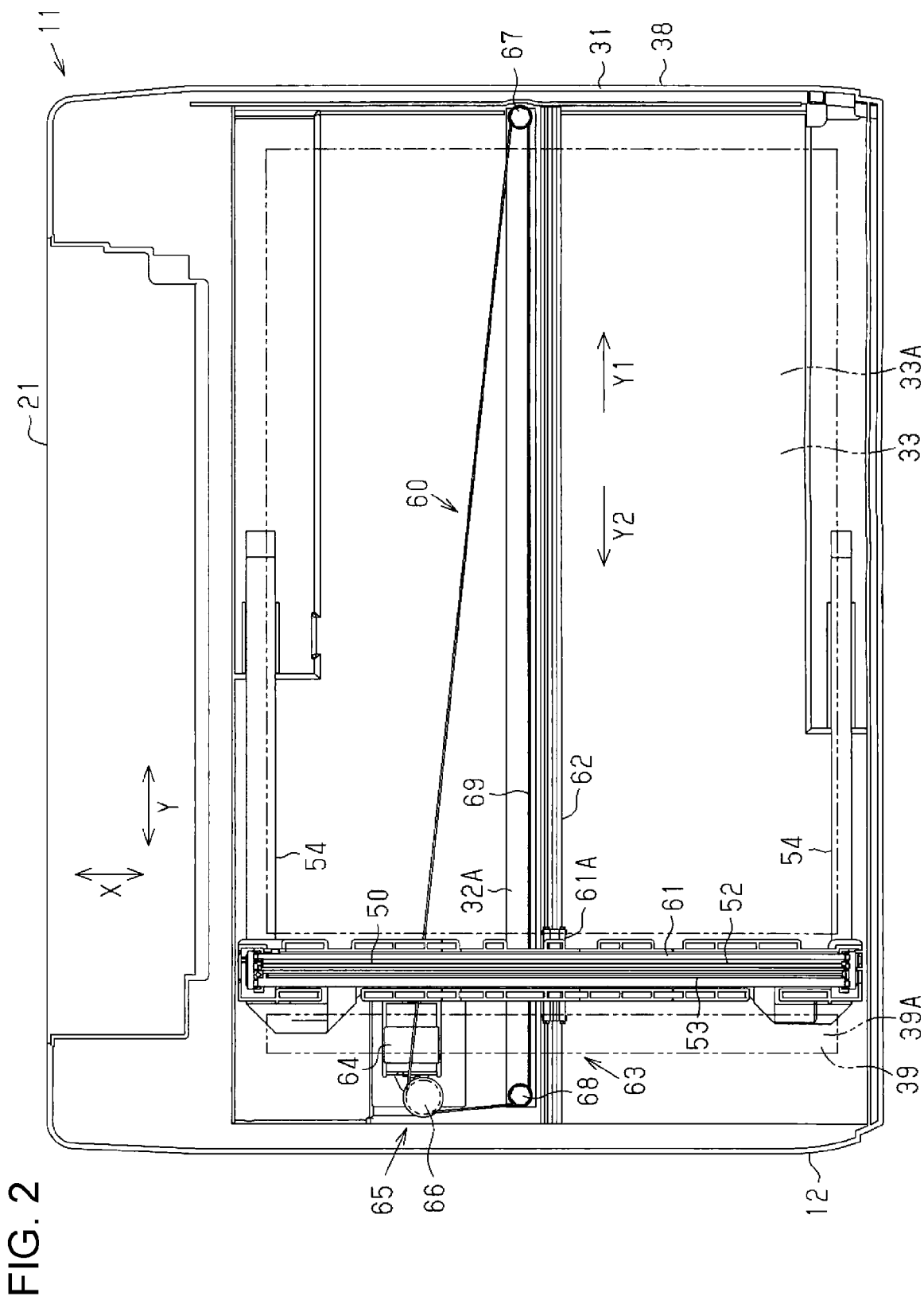
FIG. 2 is a schematic plan view illustrating a scanner device with a document placing table cover opened.
Figure 3:
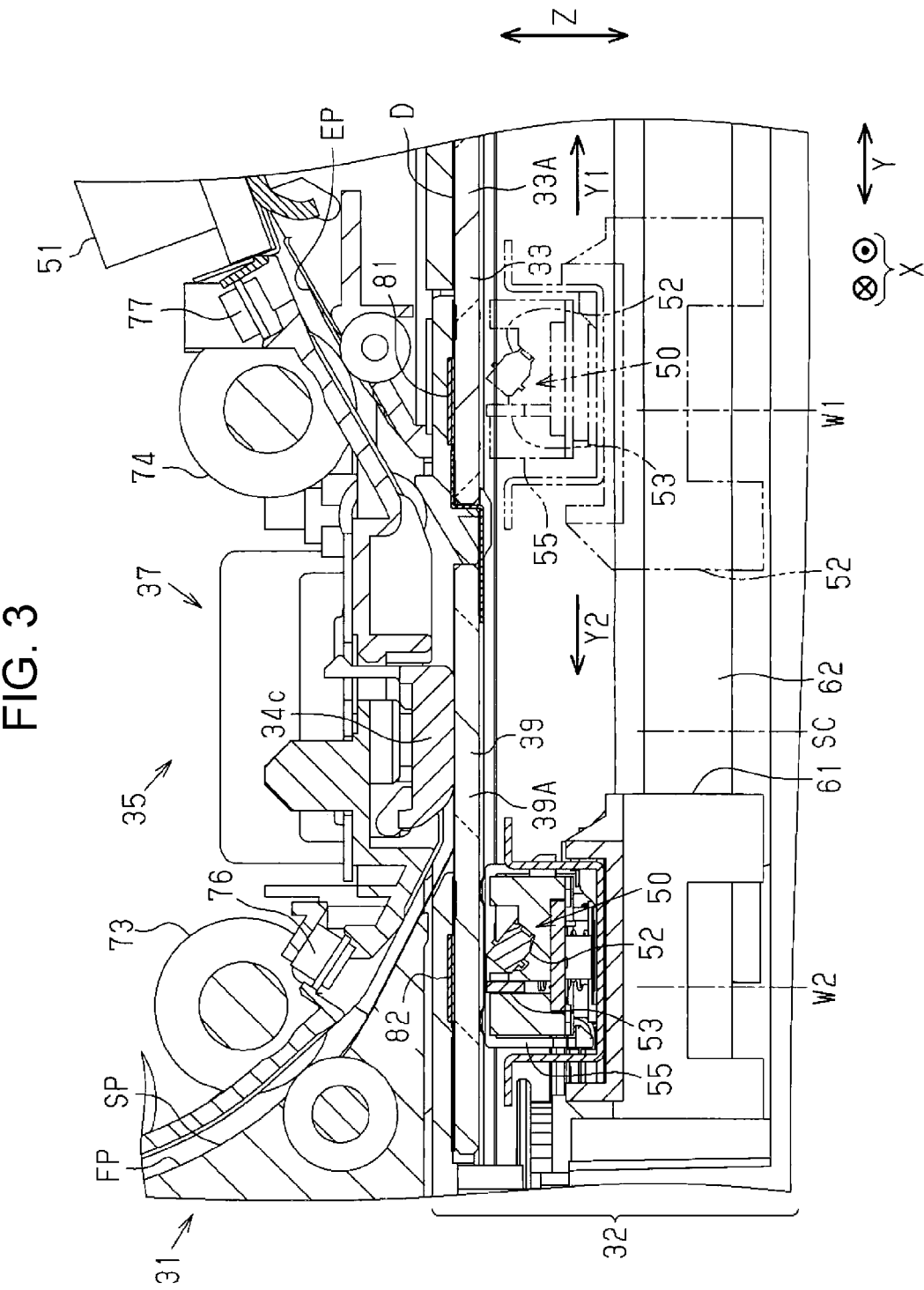
FIG. 3 is a partial side sectional view illustrating a schematic configuration of the scanner device.

As illustrated in FIGS. 2 and 3, the main body 32 of the scanner device 31 has a box-shaped case 38 having opening portions at a portion facing the document placing table cover 34 illustrated in FIG. 1. The document placing table 33 is formed with a large rectangular-shaped glass plate 33A being fitted into a large opening portion of the case 38. A reading window 39 is formed with a small long rectangular-shaped glass plate 39A being fitted into a small opening portion of the case 38. The glass plate 33A of the document placing table 33 is an area on which the document D to be read by a flatbed method is placed, and has a size slightly larger than the maximum document size can be read by the scanner device 31. The glass plate 39A of the reading window 39 is at a reading position where an image of the document D transported from the document transport unit 35 is read. In the present embodiment, an example of a transparent member is configured by the glass plates 33A and 39A defining the position of the document D.

The document placing table cover 34 illustrated in FIG. 1 is openable/closable in a closed position where the document D placed on the document placing table 33 is pressed down as illustrated in FIGS. 2 and 3 and an open state when setting a document D on the document placing table 33 or removing the document D after reading is performed.

The document D sent into the transport mechanism 37 by the document transport unit 35 illustrated in FIG. 1 is sent out to a position substantially opposite to the reading window 39 (see FIG. 3) on the back surface of the document placing table cover 34 in a closed state, an image thereon is read on the reading window 39, and is discharged to the discharge area.

As described above, the scanner device 31 according to the present embodiment operates in two kinds of modes: a flatbed (FB) mode for reading a document D disposed on the flatbed type document placing table 33 and an auto document feeder (ADF) mode for reading a document D transported from the set tray 36 by the document transport unit 35 at a reading position corresponding to the reading window 39 during the transport.

As illustrated in FIG. 2, in the case 38, a linear reading module 50 extending along a main scanning direction X, and a transport unit 60 relatively moving the document D (see FIG. 3) and the reading module 50 in a sub scanning direction Y are provided. The transport unit 60 includes a sensing carriage 61 in which the reading module 50 is installed. Moreover, the transport unit 60 includes a guide rail 62 extending along the sub scanning direction Y, and a driving mechanism 63 that applies a power to the carriage 61 for transporting (moving) the carriage 61 along the guide rail 62 in the sub scanning direction Y and moves the carriage 61 in the sub scanning direction Y. The carriage 61 is supported in a state movable in a rail longitudinal direction (sub scanning direction Y) with respect to the guide rail 62 via an engage portion 61A.

As illustrated in FIG. 2, the reading module 50 is installed in the carriage 61 at a position on the opposite side (lower side) from the document D (see FIG. 3) set on the upper surface (placement surface) with respect to the glass plate 33A. The reading module 50 has a function of moving with the carriage 61 in the sub scanning direction Y intersecting with the main scanning direction X coincide with the longitudinal direction thereof and reading the document D. The reading module 50 includes a linear light source 52 that irradiates the document D (see FIG. 3) with light via the glass plates 33A and 39A and a reading element 53 disposed along the main scanning direction X as an extending direction of the linear light source 52, and condenses and receives the light reflected from the document D. The reading module 50 has a length equal to or longer than an estimated maximum width of the document D in a longitudinal direction (main scanning direction X). As an example, the length of the reading module 50 is set to a value slightly longer than the estimated maximum width of the document D, for example, A3 size (width 320 mm) or A4 size (width 210 mm).

As illustrated in FIG. 2, the driving mechanism 63 includes a first motor 64 (electric motor) serving as a power source for moving the carriage 61 in the sub scanning direction Y and a power transmission mechanism 65 that transmits the power of the first motor 64 to the carriage 61. When the first motor 64 is driven to rotate in a normal direction, the carriage 61 moves (forwards) in a forward direction Y1 (right direction in FIG. 2) in the sub scanning direction Y, and when the first motor 64 is driven to rotate reversely, the carriage 61 moves (returns) in a backward direction Y2 (left direction in FIG. 2).

The power transmission mechanism 65 includes a drive pulley 66 rotated by the power of the first motor 64, two driven pulleys 67 and 68 disposed on both end portions of a sheet metal member 32A extending along the guide rail 62, and an endless belt 69 wound around each of the pulleys 66 to 68 and pulling the carriage 61.

The carriage 61 is fixed on a part of a portion of the belt 69 extending in parallel to the guide rail 62. When the first motor 64 is driven, the drive pulley 66 rotates and the belt 69 circularly moves, and thereby the carriage 61 moves along the sub scanning direction Y. The reading module 50 reads the document D placed on the document placing table 33 during the carriage 61 is moved along the guide rail 62 in the sub scanning direction Y.

As illustrated in FIG. 2, one end portion of a pair of flexible cables 54 extending in the sub scanning direction Y is connected to the both end portions of the carriage 61 in the main scanning direction X. The other end portion (base end portion) of the pair of flexible cables 54 is connected to a control unit 90 (see FIG. 8) accommodated in the device main body 12. The flexible cable 54 contains a plurality of electric wires for sending a control signal from the control unit 90 to the first motor 64 and the reading module 50 or sending read data of the reading module 50 to the control unit 90.

On the other hand, the document transport unit 35 illustrated in FIG. 3 includes a pickup roller that configures a part of a feeding mechanism for sending a document from the set tray 36 to a transport path FP side in the transport mechanism 37, and a plurality of pickup roller pairs 73 (only one pickup roller pair 73 is illustrated in FIG. 3) provided along a transport path SP to transport a document sent from the pickup roller to a reading position SC. The document fed by the plurality of pickup roller pairs 73 is read by the reading module 50 on the carriage 61 disposed at a reading position SC during the transport via the glass plate 39A of the reading window 39. The read document is discharged from the transport mechanism 37 to the outside by a plurality of discharge roller pairs 74 (only one discharge roller pair 74 is illustrated in FIG. 3) provided along a discharge path EP. At the reading position SC, an elongated guide portion 34c that presses down the document to the reading window 39 side is disposed in a state extending along the main scanning direction X. In the ADF mode, a plurality of documents D set on the set tray 36 (see FIG. 1) are sent into the transport mechanism 37 one by one, and read at the reading position SC in the middle of the transport path FP by the reading module 50 on the carriage 61.

In addition, as illustrated in FIG. 3, in the transport mechanism 37, a first detection unit 76 capable of detecting a document being fed at a position on an upper stream side from the reading position SC in the transport direction and a second detection unit 77 capable of detecting the document being discharged to a position on a downstream side from the reading position SC in the transport direction are provided. At a position on the downstream side from the second detection unit 77 in the transport direction, a reading unit 51 capable of reading a reading surface (front surface) and an opposite side surface (back surface) of a document by the reading module 50 in the middle of the discharge path EP is disposed. For this reason, the scanner device 31 can read the both sides of the document in the ADF mode. The reading unit 51 contains the same reading module 50 on the carriage 61.

As illustrated in FIG. 3, the reading module 50 installed in the carriage 61 is positioned to face a back surface the opposite side of a placement surface (front surface) of the document D on the glass plates 33A and 39A. The reading module 50 has the linear light source 52, the reading element 53, and a housing 55 that accommodates the linear light source 52, and the reading element 53 in a state where the linear light source 52, and the reading element 53 can receive light. The reading module 50 is capable of emitting light toward the document D on the glass plate 39A by the linear light source 52 and receiving the reflected light from the document D by the reading element 53.

As illustrated in FIG. 3, on the upper surface portion of the main body 32 (see FIG. 1 as well) of the scanner device 31, two white reference plates 81 and 82 with a reflection surface having a high uniform reflectivity are disposed at a position avoiding the reading position of the document D by the reading module 50 on a moving path of the carriage 61. A first white reference plate 81 and a second white reference plate 82 are objects to be read when acquiring white reference data used for a shading correction. The first white reference plate 81 and the second white reference plate 82 are read by the reading module 50 on the carriage 61 disposed at a first white reference reading position W1 or, a second white reference reading position W2 at a predetermined period necessary to read the white reference plate. As illustrated in FIG. 3, when reading the first white reference plate 81, the carriage 61 is disposed at the first white reference reading position W1. As illustrated in FIG. 3, when reading the second white reference plate 82, the carriage 61 is disposed at the second white reference reading position W2.

In addition, when a reading operation is performed in FB mode, the document D on the glass plate 39A can be read by the reading module 50 by the carriage 61 moving from a standby position indicated by two-dot chained line in the forward direction Y1. After reading the document D, the carriage 61 moves from the reading end position thereof in the reward direction Y2 and returns to the standby position.

Figure 4:
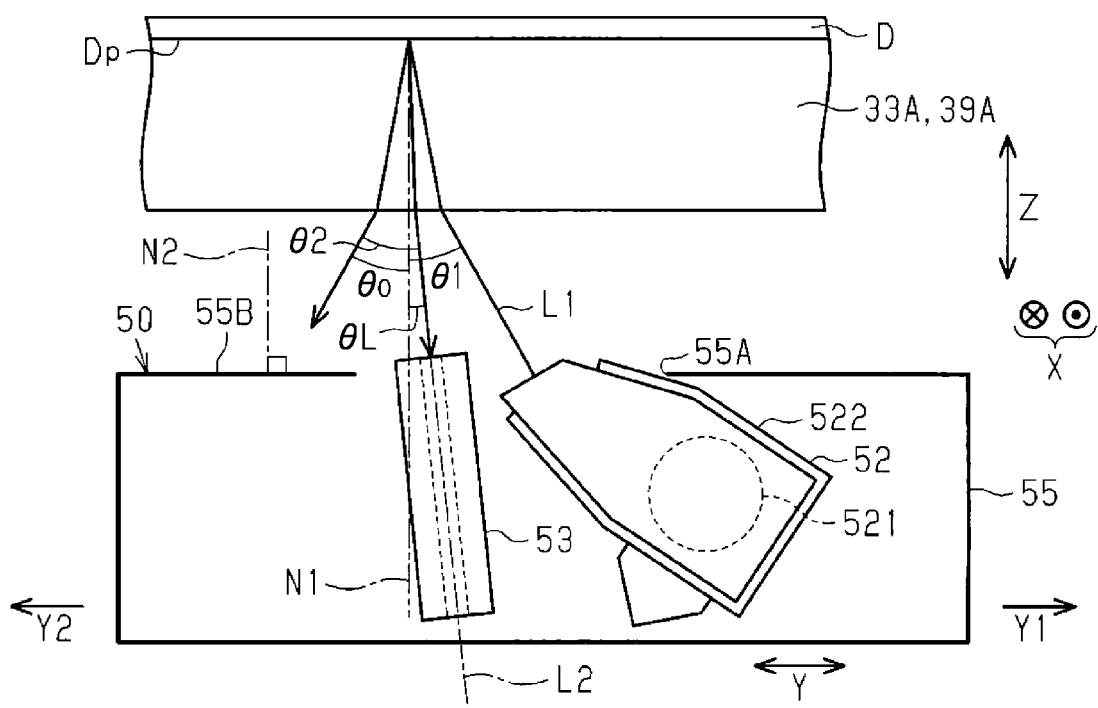
FIG. 4 is a schematic side view illustrating a schematic configuration of a reading module.

Next, with reference to FIG. 4, the configuration of the reading module 50 will be described in detail. As illustrated in FIG. 4, the reading module 50 includes the linear light source 52 that irradiates the document D with light via the glass plates 33A and 39A, and the reading element 53 that is disposed along an extending direction (main scanning direction X) of the linear light source 52 and condenses and receives the light reflected from a reading surface Dp of the document D (hereinafter, refer to as "document surface Dp"). The housing 55 has an opening 55A in a portion facing the glass plates 33A and 39A, and it is possible to project light onto the document surface Dp of the linear light source 52 and receive the reflected light from the document surface Dp of the reading element 53 in the housing 55. Moreover, the housing 55 has a facing surface 55B facing the glass plates 33A and 39A.

The linear light source 52 illustrated in FIG. 4 is disposed at an attitude angle that a main optical axis L1 of the linear light source 52 is inclined at a first angle $\theta 1$ with respect to a direction of a normal line N1 (normal direction Z) of the glass plates 33A and 39A (that is, reading surface Dp). The linear light source 52 includes a light emitting body 521 such as LED, and a light guide 522, for example, as a light guide member that directs a reading position to a direction forming the first angle $\theta 1$ with respect to the normal direction Z while guiding the light emitted from the light emitting body 521 in the main scanning direction X, and can guide the light. The light guide 522 is made of a transparent resin such as an acrylic resin, and guides the light from the light emitting body 521 disposed on a rod-shaped end surface to illuminate a band-like area to be read with uniform brightness. As illustrated in FIG. 4, the main optical axis L1 driven from the light guide 522 directs in a direction inclined toward the glass plates 33A and 39A side by a predetermined angle with respect to an optical axis of the light guide 522. The first angle $\theta 1$ is equal to an incident angle at which the light emitted from the light guide 522 is incident on the back surfaces of the glass plates 33A and 39A.

As illustrated in FIG. 4, the reading element 53 is disposed such that an optical axis L2 thereof is facing a position that the light reflected at a reading position of the document D is emitted from the glass plates 33A and 39A, and the reading element 53 is disposed at an attitude angle that is inclined at a second angle $\theta L$ (inclination angle) in the same direction (right side in FIG. 4) with a direction that the main optical axis L1 of the linear light source 52 is inclined with respect to the normal direction Z. In other words, the optical axis L2 of the reading element 53 is disposed in an attitude inclined by the second angle $\theta L$ in the same direction with the linear light source 52 with respect to a normal line N2 (normal direction Z) of the facing surface 55B that the housing 55 is facing the glass plates 33A and 39A. In the present embodiment, the second angle $\theta L$ is set to a value smaller than the first angle $\theta 1$ ($\theta L < \theta 1$). The light emitted in a direction of a main axis L1 from the linear light source 52 is incident on the glass plates 33A and 39A, the light refracted by the glass plates 33A and 39A is reflected on the document surface Dp, and the regularly reflected light is refracted on the back surface of the glass plate 33A and is emitted by a predetermined emission angle $\theta o$.

In FIG. 4, when an angle (principal ray incident angle) formed between the main optical axis L1 (principal ray) of the linear light source 52 and the normal line N1 is $\theta 1$, an angle formed between an emission direction in which the regularly reflected light form the document surface Dp is emitted from the glass plates 33A and 39A and the normal line N1, that is, when an emission angle of the regularly reflected light (principal ray emission angle) emitted from the glass plates 33A and 39A is $\theta o$, a relation of $\theta o = \theta 1$ is satisfied. In other words, the light from the linear light source 52 is incident on the glass plates 33A and 39A at an incident angle $\theta 1$, and is emitted at the emission angle $\theta o$. At this time, the incident angle $\theta 1$ and the emission angle $\theta o$ are equal ($\theta 1 = \theta o$). The regularly reflected light that the light incident on the glass plates 33A and 39A at the incident angle $\theta 1$ is reflected by the document surface Dp is emitted from the glass plates 33A and 39A at the emission angle $\theta o$. At this time, an angle $\theta 2$ formed between the principal ray of the regularly reflected light emitted at the emission angle $\theta o$ from the glass plates 33A and 39A and the optical axis L2 of the reading element 53 satisfies $\theta 2 = \theta o + \theta L$ (in the equation, $\theta o = \theta 1$).

Figure 5:
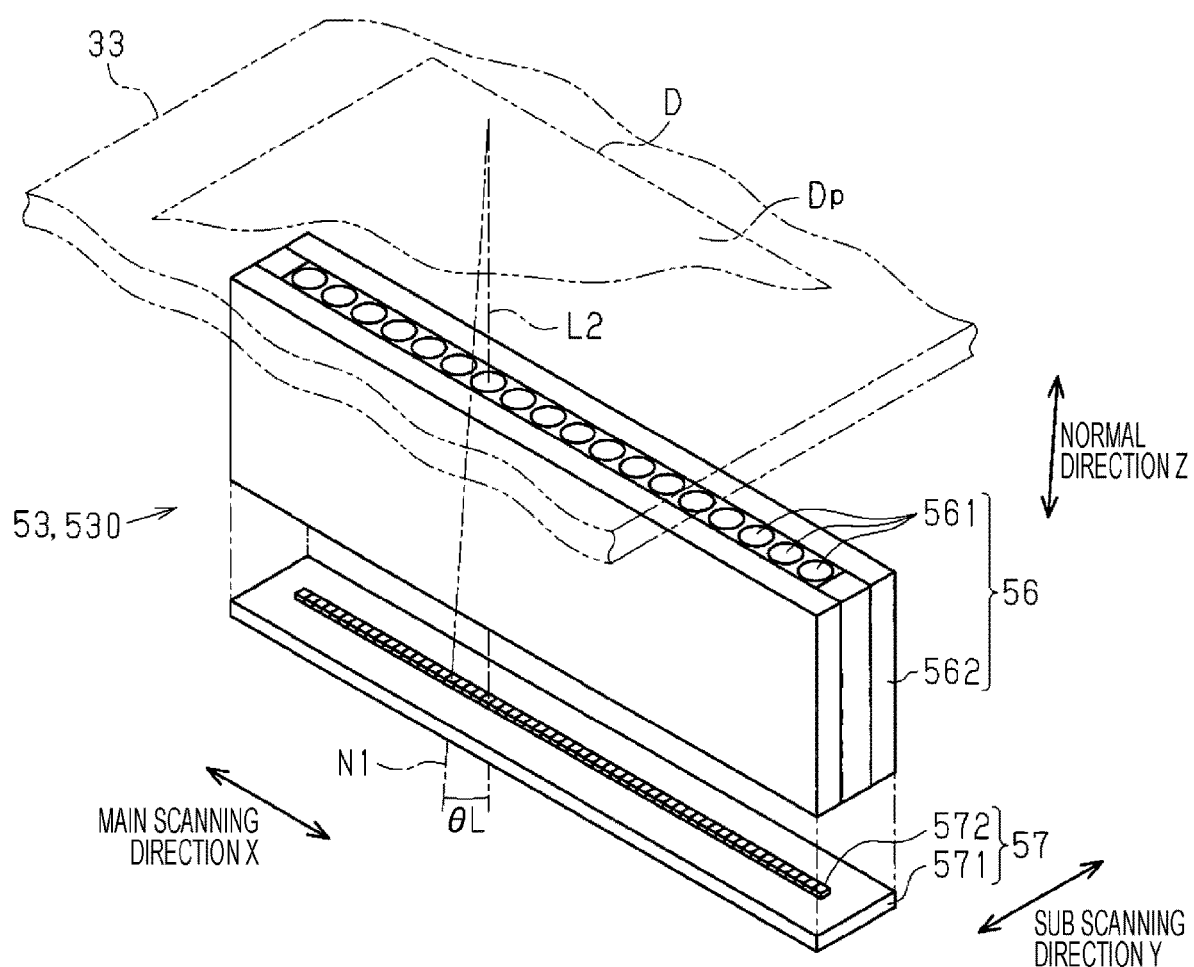
FIG. 5 is a perspective view illustrating a schematic configuration of a reading element.

FIG. 5 illustrates the reading element 53 in an example using a contact image sensor module 530 (hereinafter, referred to as "CISM") as the reading module 50. As illustrated in FIG. 5, the reading element 53 configuring the CISM 530 is provided with an image forming element 56 that is disposed along the main scanning direction X as an extending direction of the linear light source 52 (see FIG. 4) and condenses the light reflected from the document D, and a light receiving element 57 that is disposed along the main scanning direction X as an extending direction of the image forming element 56 and receives the light condensed by the image forming element 56. The image forming element 56 and the light receiving element 57 are arranged in this order from a surface of the glass plates 33A and 39A. The image forming element 56 receives the scattered reflected light spread around the regularly reflected light of the emission angle $\theta o$ among the reflected lights from the document surface Dp, and the light receiving element 57 receives the image of light formed with the scattered reflected light.

The image forming element 56 has a lens array 562 in which a plurality of lenses 561 are arranged in a line so that the optical axis L2 thereof are parallel to each other. The light receiving element 57 has a substrate 571 and a linear type image sensor 572 mounted on the substrate 571. The image sensor 572 includes a contact image sensor (CIS).

The lens array 562 faces the surfaces of the glass plates 33A and 39A at positions relatively close to each other. The plurality of lenses 561 configuring the lens array 562 are arranged along the main scanning direction X. The lens array 562 is provided to condense the light incident on a lens 561 on the image sensor 572. As the lens array 562, a rod lens array in which the plurality of rod-shaped lenses 561 are arranged is used. Particularly in this example, as the lens array 562, a selfoc lens array (registered trade mark) (SLA) that is an optical system that arranges a large number of the lenses 561 made of a refractive index distribution type lens (Selfoc) to form one continuous image as a whole, and is a refractive index distribution type rod lens array that is suitable for an optical system for a scanning system is used.

In addition, the image sensor 572 has "one" imaging element in the sub scanning direction Y, and a plurality of imaging elements (for example "2048") in the main scanning direction X. For this reason, the image sensor 572 is capable of imaging a "1 line" image in the main scanning direction X. Here, an optical path length from the document D to an incident port of the image forming element 56 (that is, lens array 562) configuring the reading element 53 is set to a focal length of the plurality of lenses 561 configuring the lens array 562. Therefore, the image of the document surface Dp is formed on the surface of the light receiving element 57.

The image forming element 56 and the light receiving element 57 illustrated in FIG. 5 are accommodated in the housing 55 with the linear light source 52 illustrated in FIG. 4. The optical axis L2 of the image forming element 56 is inclined at the second angle θL in the same direction as a direction that the main optical axis L1 of the linear light source 52 illustrated in FIG. 4 is inclined with respect to the normal line N1 (normal direction Z) of the glass plates 33A and 39A. In other words, the optical axis L2 of the image forming element 56 is inclined by the second angle θL in the same direction with the linear light source 52 from a direction of the normal line N2 (normal direction Z) of the facing surface 55B facing the glass plates 33A and 39A of the housing 55.

The second angle θL illustrated in FIGS. 4 and 5 is set to a predetermined value within a range of, for example, 1 to 20 degrees. In particular, it is preferable that the second angle θL be set to a value within a range of 3 to 10 degrees. In the example illustrated in FIG. 4, the second angle θL is set 7 degrees as an example. Here, when the second angle θL is less than 3 degrees, in a case where the document D is a glossy paper or a semi-glossy paper, there is a possibility that excessively bright Gaussian scattered reflected light relatively widely distributed around the regularly reflected light is received as an incident light depending on the reflection characteristics, it is preferable that the second angle θL be equal to or larger than 3 degrees so that the Lambert scattered reflected light is received as the incident light. When the second angle θL exceeds 10 degrees, in a case where the document D is a glossy paper or a semi-glossy paper, it is possible to receive the Lambert scattered reflected light by avoiding the reception of the Gaussian scattered reflected light. Since the received light gets dark, it is preferable that the second angle θL be equal to or less than 10 degrees in order to secure the necessary amount of light. The second angle θL is not limited to the above-described condition, and the angle may be set to less than 3 degrees or greater than 10 degrees as long as an effect equal to or higher than a certain level can be obtained in the image quality of the read image. In the present specification, a glossy medium such as a glossy paper and a semi-glossy medium such as a semi-glossy paper are collectively referred to as a "glossy medium".

Figure 6:
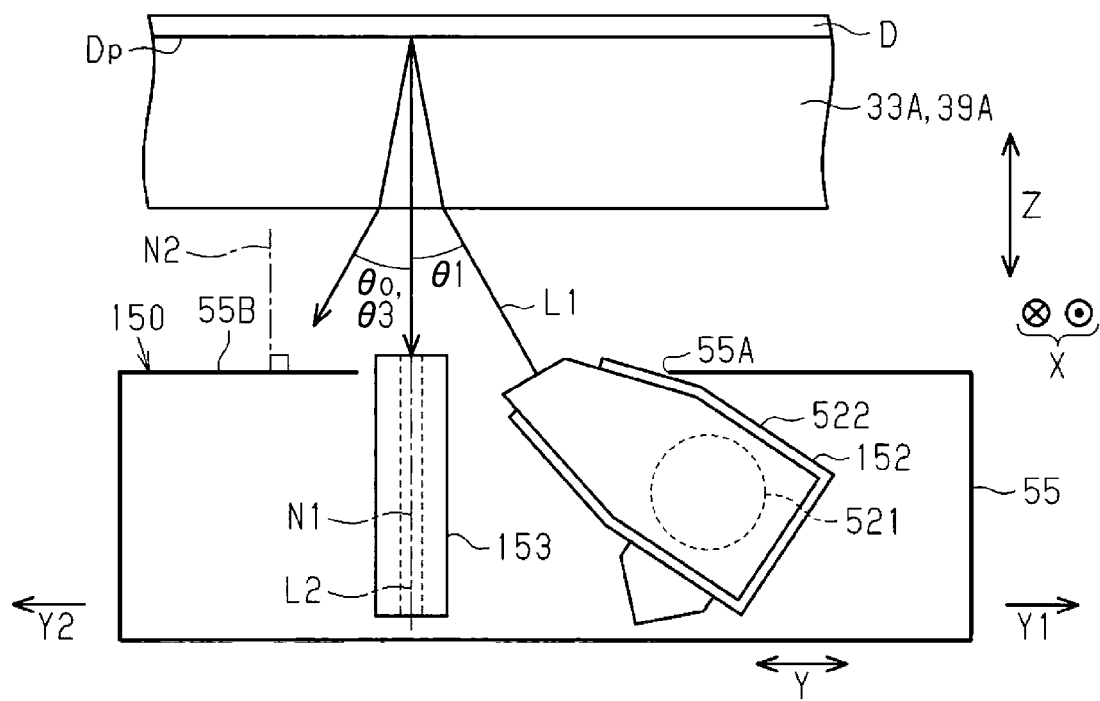
FIG. 6 is a schematic side view illustrating a schematic configuration of a reading module of a comparative example.

FIG. 6 is a view illustrating a reading module 150 of a comparative example. The reading module 150 accommodates a linear light source 152 and a reading element 153 which are similar to those of the reading module 50 in an example illustrated in FIG. 4 in the housing 55. The main optical axis L1 of the linear light source 152 is disposed at an oblique attitude angle forming the first angle θ1 with respect to the normal line N1 of the document surface Dp similar to the linear light source 52 of the example illustrated in FIG. 4.

The reading element 153 of the comparative example illustrated in FIG. 6 is provided with the image forming element 56 and the light receiving element 57 illustrated in FIG. 5 in the same manner as the example illustrated in FIG. 4, but the optical axis L2 of the reading element 153 is disposed in an attitude parallel to the normal line N1 (normal direction Z) of the document surface Dp. In other words, in the comparative example illustrated in FIG. 6, the second angle θL is 0°. Therefore, an angle θ3 formed between the principal ray of the regularly reflected light emitted by the emission angle θo from the glass plates 33A and 39A and the optical axis L2 of the reading element satisfies θ3=θo (in the equation, θ0=θ1).

Next, with reference to FIG. 7, reflection characteristics that indicates the relationship between a visual field angle θ and brightness in a case where the document D made of a gray printed semi-glossy paper 30% of reflectivity is irradiated with light at the incident angle θ1 of 10 degrees from the linear light source 52 will be explained. Here, the visual field angle θ is an angle formed by the optical axis L2 of the reading element 53 with respect to the normal line N1 of the document surface Dp. In this graph, the visual field angle θ is set to zero degrees (0°) parallel to the normal line N1, the inclination side in the same direction as the main optical axis L1 of the linear light source 52 with respect to the normal line N1 is negative side, and the inclination side in the same direction as the principal ray of the regularly reflected light reflected by the document surface Dp with respect to the normal line N1 is positive side.

Figure 7:
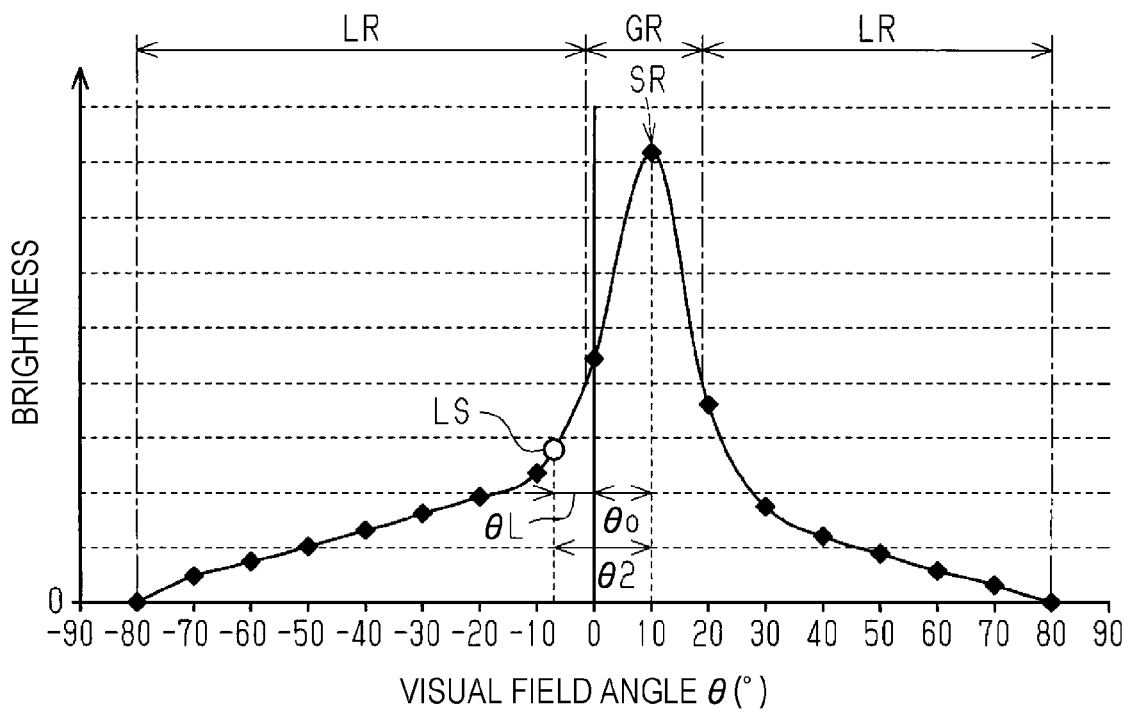
FIG. 7 is a graph illustrating a relationship between a visual field angle and brightness.

As illustrated in FIG. 7, in the visual field angle θ, when the visual field angle θ which is the regularly reflected angle on an opposite side across θ=0° with respect to the incident angle θ1 (for example, −10°) is 10°, the visual field angle θ is at a peak point SR (regular reflection point SR) where brightness on a reflection characteristics curve becomes excessively high. As illustrated in FIG. 7, in a case where the document D is a semi-glossy paper (glossy medium), depending on the reflection characteristics, a Gaussian scattering region GR with excessive brightness is relatively widely (for example, within a range of −2° to 18°) distributed around the regular reflection point SR, and a Lambert scattering region LR is widely distributed around the Gaussian scattering region GR. In the Lambert scattering region LR, although the brightness is not excessive, the brightness becomes dark as the absolute value of the visual field angle θ increases. A point LS indicate by a white circle on the reflection characteristics curve illustrated in FIG. 7 indicates the brightness of the light incident on the reading element 53 inclined at the second angle θL (for example, 7°). In the configuration of the example (FIG. 4), the optical axis L2 of the reading element 53 (image forming element 56) is inclined by the second angle θL toward the same direction (negative direction) with the main optical axis L1 of the linear light source 52 with respect to the normal direction Z, as illustrated in FIG. 7, the point LS is separated from the regular reflection point SR by θ2=θo+θL. For this reason, the point LS at visual field angle θ=−7° of the reading element 53 of the example is present within the Lambert scattering region LR slightly away on the outside of the Gaussian scattering region GR. As described above, in a case where the document D is a glossy medium, the second angle θL is set to an angle at which the image forming element 56 can receive the Lambert scattering region LR scattered reflected light by avoiding the Gaussian scattering region GR among the reflected light reflected from the document D.

In contrast, in the configuration of the comparative example (FIG. 6), since the second angle θL of the reading element 153 is 0 degrees (θL=0°), when the visual field angle θ of the reading element 153 separated by angle θo from the regular reflection point SR is 0°, the reading element 153 takes in the skirt of the Gaussian scattering region GR. In the example of FIG. 7, compared to the reading element 153 (image forming element 56) of the comparative example, if the second angle θL of the reading element 53 (image forming element 56) of the example, for example, can be further increased to the negative side by 2 degrees or more, it is not necessary to read the skirts of the Gaussian scattering region GR. In the example illustrated in FIG. 4, the optical axis L2 of the image forming element 56 is inclined 7 degrees toward negative side as an example with respect to the normal direction Z, and the visual field angle θ of the reading element 53 is removed from the skirts of the Gaussian scattering region GR.

In each configuration of the example illustrated in FIG. 4 and the comparative example illustrated in FIG. 6, a verification experiment was conducted to read a gray glossy paper to measure the reflectivity. The reflectivity (=Wg/Ww×100) (%) as a reference of the gray glossy paper was obtained using light reception power Wg measured by reading standard white board in advance and light reception power Ww measured by reading the gray glossy paper. The reflectivity as a reference for the gray glossy paper was approximately 30%.

Next, in the example illustrated in FIG. 4 and the comparative example illustrated in FIG. 6, a reading is performed using a white glossy document and the aforementioned gray glossy paper (reflectivity of approximately 30%), and the power of the light receiving element 57 (received light power) at the time of reading was measured based on the reflectivity of the gray glossy paper electric power. In the example illustrated in FIG. 4, the received light power of the light receiving element 57 (see FIG. 5) when the white glossy document was read was 168 μW (micro watt), and the received light power of the light receiving element 57 when reading the gray glossy paper was 51.8 μW. As a result, the reflectivity of the gray glossy paper was 51.8/168=31%. On the other hand, in the comparative example illustrated in FIG. 6, the received light power of the light receiving element 57 when the white glossy document was read was 173 μW, and the received light power of the light receiving element 57 when reading the gray glossy paper was 64 μW. As a result, the reflectivity of the gray glossy paper was 64/173=37%. The reflectivity (31%) of the gray glossy paper in the example is closer to the standard reflectivity (approximately 30%) than in the comparative example, and it was recognized that the gradation can be expressed reliably. In a case where the document D is inclined toward the side where the regularly reflected light is collected due to wrinkles of the medium or the like at the reading position, in the comparative example illustrated in FIG. 6 where the reading element 53 is not inclined, the gradation of the wrinkled portion was changed to the bright side and white floating was recognized. However, in the example illustrated in FIG. 4 in which the reading element 53 is inclined to the same side as the linear light source 52, it was checked that white floating can be suppressed. The reflectivity (%) corresponds to a value of gradation 0% to 100%.

Figure 8:
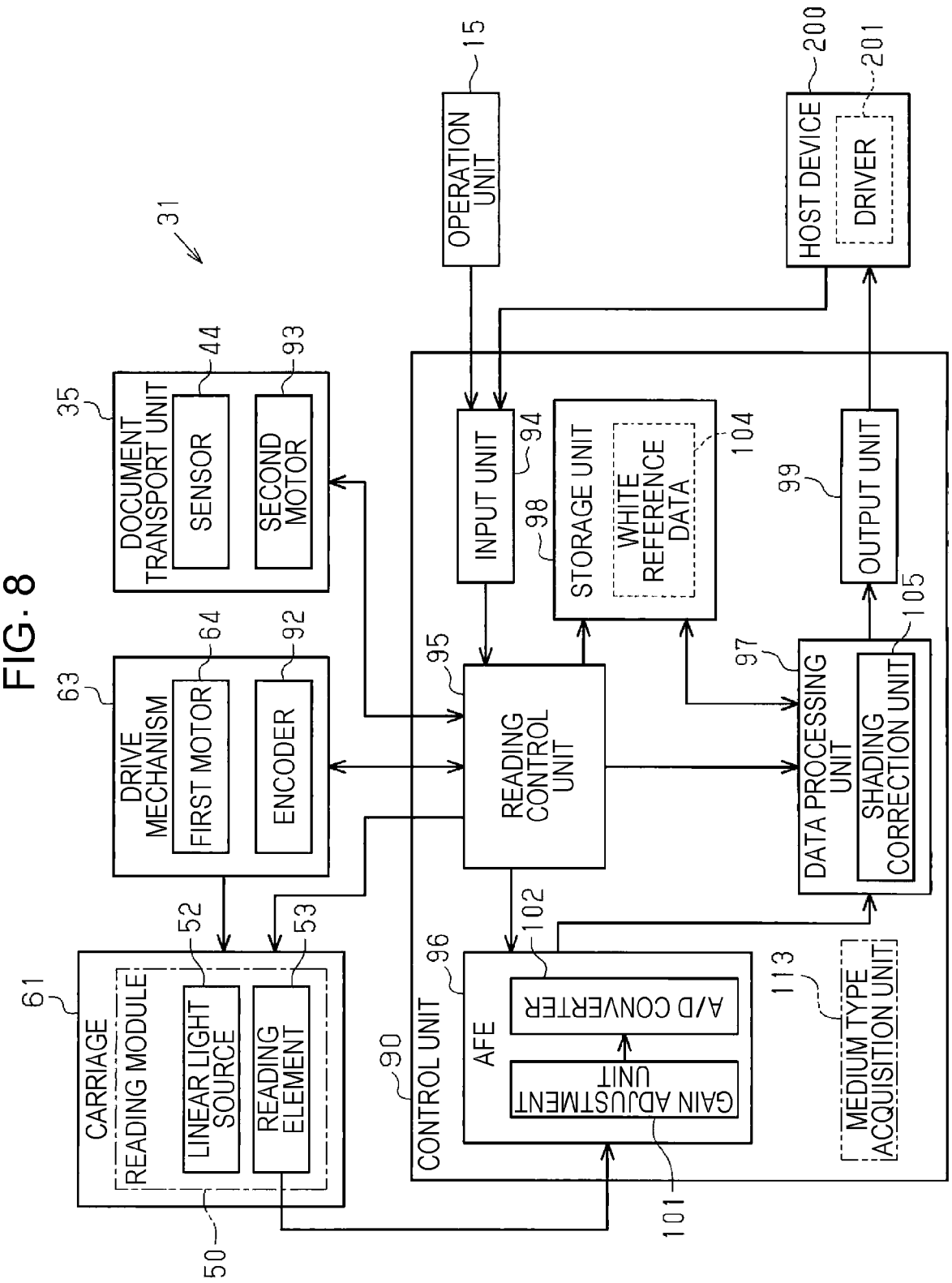
FIG. 8 is a block diagram illustrating an electrical configuration of the scanner device.

Next, with reference to FIG. 8, an electrical configuration of the scanner device 31 in the multi-function peripheral 11 will be described. FIG. 8 is a block diagram illustrating the electrical configuration relating to the image reading control, and a part of the configuration inside the document transport unit 35 is omitted.

The scanner device 31 includes the control unit 90 that controls the entire apparatus and performs various processes for reading an image, the carriage 61 on which the reading module 50 having the linear light source 52 and the reading element 53 is installed, the driving mechanism 63 for moving the carriage 61 in the sub scanning direction Y, and the document transport unit 35. The driving mechanism 63 includes the first motor 64 and an encoder 92. The document transport unit 35 includes a sensor 44 and a second motor 93. The reading module 50 installed on the carriage 61 is used for both the FB mode and the ADF mode. In FIG. 8, the reading unit 51 (see FIG. 3) provided in the document transport unit 35 and incorporating the same reading module 50 installed on the carriage 61 is omitted.

The control unit 90 illustrated in FIG. 8 is electrically connected to the reading module 50, the first motor 64, the encoder 92, the sensor 44, the second motor 93, the operation unit 15, and the like. The control unit 90 drives the first motor 64 to move the carriage 61 with the reading module 50 in the sub scanning direction Y. The control unit 90 controls the speed of the first motor 64 based on a number of encoder pulses proportional to the moving speed of the carriage 61 input from the encoder 92 and moves the carriage 61 at a constant speed in the sub scanning direction Y in the reading operation of the document D. The control unit 90 causes the reading module 50 to read the document D on the glass plate 33A, for example, during the forward movement of the carriage 61.

The control unit 90 drives the second motor 93 in a state in which the sensor 44 detects the document D on the set tray 36 and transports the documents D set on the set tray 36 one by one. The document D is read by the reading module 50 on the carriage 61 at the reading position SC in the middle of transport.

In the reading module 50, the light irradiated from the linear light source 52 is reflected by the document surface Dp, the light condensed by each lens 561 of the lens array 562 constituting the image forming element 56 is received by the light receiving element 57, and charges corresponding to the amount of received light are accumulated and sent to the control unit 90 as image read data (electric signal) formed of analog data.

The control unit 90 includes a CPU, a ROM in which a program and the like are stored, a RAM for temporarily storing data and the like as a main memory, an interface for controlling input and output with the host device and the like, and a general computer including a system bus serving as a communication path between the respective components. Moreover, the control unit 90 includes an application specific integrated circuit (ASIC) designed to perform each processing exclusively. As described above, the control unit 90 includes software of a computer that executes the program and hardware by an electronic circuit such as an ASIC.

The control unit 90 includes a reading control unit 95 that controls the linear light source 52 in the carriage 61, the reading module 50, the driving mechanism 63, and the document transport unit 35. The control unit 90 includes an AFE 96 that performs analog processing such as converting analog data output from the reading module 50 to digital data, a data processing unit 97 that performs various corrections on the digital data output from the AFE 96, and a storage unit 98 for storing digital data for the data processing unit 97 to perform various corrections. The reading control unit 95 drives and controls the first motor 64 to control the movement of the carriage 61. In order to acquire the white reference data and the like used for correcting the read image, the reading control unit 95 controls reading of the white reference plates 81 and 82 (see FIG. 3) and stores the obtained white reference data 104 and the like in the storage unit 98. Further, the control unit 90 includes an output unit 99 for sending data from the data processing unit 97 to the host device 200, and the like.

The reading control unit 95 controls timing of reading data from the reading module 50 and the like. The reading control unit 95 controls transfer of data read by the reading module 50 to the AFE 96. The AFE 96 includes a gain adjustment unit 101 which is constituted by a predetermined IC (analog front end IC) and performs gain adjustment for increasing or decreasing an input signal with a gain G set for input analog data to output a signal of a required level, and an A/D converter 102 for converting analog data into digital data. The AFE 96 may be mounted on the substrate inside the carriage 61.

The data processing unit 97 includes a shading correction unit 105 that performs shading correction on the image data output from the A/D converter 102. The data processing unit 97 temporarily stores the image data output from the A/D converter 102 in the storage unit 98, and uses the corresponding white reference data and the black reference data to perform shading correction according to a predetermined correction formula for each pixel. In addition to shading correction, the data processing unit 97 performs various corrections such as gamma correction, and outputs the corrected image data to the output unit 99.

Next, the operation of the scanner device 31 in the multi-function peripheral 11 will be described. When a user instructs scanning by operating an operation unit (keyboard or mouse) on the host device 200, the multi-function peripheral 11 receives the scan job from the host device 200 via communication. When the user instructs to execute scanning by operating the operation unit 15, the multi-function peripheral 11 accepts the scan job. When the user instructs the execution of copy of the document D by the operating the operation unit 15, the multi-function peripheral 11 accepts the scan job and the print job. The control unit 90 drives and controls the scanner device 31 based on the scan job, and causes the scanner device 31 to perform a reading operation on the document D.

When it is detected that the document D is on the set tray 36, the control unit 90 performs a reading operation in the ADF mode, and when it is detected that the document D is on the glass plate 33A of the document placing table 33, the control unit 90 performs a reading operation in the FB mod. In the ADF mode, the control unit 90 disposes the carriage 61 at the reading position SC (see FIG. 3), transports the document D by driving the document transport unit 35, and reads the document D being transported by the reading module 50 via the glass plate 39A. In the FD mode, the control unit 90 reciprocally moves the carriage 61 once from the standby position in the sub scanning direction Y and causes the reading module 50 to read the document D on the document placing table 33 via the glass plate 33A in the process of moving in the forward direction Y1.

At this time, even if the document D is a semi-glossy paper or a glossy paper, the optical axis L2 of the reading element 53 is inclined at the second angle $\theta L$ in the same direction as the inclination of the linear light source 52 with respect to the normal direction Z of the glass plate 33A. For this reason, among the reflected light from the document surface Dp, the scattered reflected light of the Gaussian scattering region GR is not incident on the reading element 53, but the scattered reflected light of the Lambert scattering region LR is incident on the reading element 53. As a result, even in a case where the document D is a glossy medium, it is possible to suppress the excessively bright Gaussian scattered reflected light around the regularly reflected light from the document surface Dp from entering the reading element 53 regardless of the reflection characteristics, and it is possible to suppress the deterioration in image quality of a read image. Since the second angle $\theta L$ in which the reading element 53 is inclined with respect to the normal direction Z is smaller than the first angle $\theta 1$ obtained by inclining the linear light source 52 with respect to the normal direction Z, the light incident on the reading element 53 does not become excessively dark and adequate brightness can be secured.

The read image reading data is subjected to a predetermined processing including shading correction based on the white reference data and the black reference data of the storage unit 98 by the data processing unit 97, and is output as image data from the output unit 99 to the host device 200. When copying is instructed, by further printing an image based on the image data by the printing device 21, the copy and printed medium P is discharged from the discharge port 21a to the stacker 18.

According to the detailed embodiment described above, the following effects can be obtained.

(1) The image reading apparatus includes the glass plates 33A and 39A for defining the position of the document D, a reading module 50 disposed on the side opposite to the document D with respect to the glass plates 33A and 39A, and the transport unit 60 relatively moving a document D and the reading module 50. The reading module 50 includes the linear light source 52 for irradiating the document D with light via the glass plates 33A and 39A, the image forming element 56 disposed along the extending direction of the linear light source 52 and condensing the light reflected from the document D, and the light receiving element 57 disposed along the extending direction of the image forming element 56 and receiving the light condensed by the image forming element 56. The linear light source 52 is disposed such that the main optical axis L1 of the linear light source 52 is inclined at the first angle $\theta 1$ with respect to the direction of the normal line N1 of the glass plates 33A and 39A (normal direction Z). Further, the image forming element 56 is disposed such that the optical axis L2 of the image forming element 56 is directed to a position at which the light reflected by the reading position of the document D is emitted from the glass plates 33A and 39A, and the image forming element 56 is inclined at the second angle $\theta L$ in the same direction as the inclination of the main optical axis L1 of the linear light source 52 with respect to the normal direction Z. Thereby, compared with the configuration of the comparative example (FIG. 6) in which the optical axis L2 of the image forming element 56 is not inclined with respect to the normal direction Z of the glass plates 33A and 39A, it is possible to suppress the inappropriate scattered reflected light (Gaussian scattered reflected light) from being incident on the image forming element 56. In other words, the image forming element 56 can receive the scattered reflected light of the Lambert scattering region LR with appropriate brightness by avoiding the Gaussian scattering region GR. Therefore, even if the document D is a glossy medium, an appropriate image can be formed on the light receiving element 57. Accordingly, it is possible to suppress deterioration in image quality of a read image due to the Gaussian scattered reflected light.

(2) The second angle $\theta L$ is smaller than the first angle $\theta 1$. Therefore, an appropriate amount of received light and depth of focus can be secured in spite of inclining the image forming element 56 with respect to the normal direction Z. Even when the document D is a glossy medium, it is possible to form an image with appropriate brightness on the light receiving element 57, and it is possible to suppress degradation in image quality of the read image.

(3) The reading module 50 includes a housing 55 that accommodates the linear light source 52, the image forming element 56, and the light receiving element 57, the housing 55 has the facing surface 55B facing the glass plates 33A and 39A, and the optical axis L2 of the image forming element 56 is inclined at the second angle θL from the direction of the normal line N2 (normal direction Z) of the facing surface 55B. Therefore, by a relatively simple configuration of disposing the image forming element 56 in an attitude inclined with respect to the housing 55 such that the optical axis L2 of the image forming element 56 in the housing 55 to be inclined at the second angle θL from the normal direction Z of the facing surface 55B of the housing 55, an appropriate Lambert scattered reflected light can be made incident on the image forming element 56.

(4) In a case where the document D is a glossy medium, the second angle θL is set to an angle that the scattered reflected light of the Lambert scattering region LR can be incident on the image forming element 56 by avoiding the Gaussian scattering region GR among the reflected light reflected from the document D. In a case where the document D is a glossy medium, the reading module 50 reads the image of the Lambert scattered reflected light by avoiding the Gaussian scattered reflected light, so that it is possible to suppress the deterioration in the image quality of the read image. Since a reading unit 51 provided in the middle of the transport path of the document transport unit 35 and capable of reading the document D (document surface Dp) being transported includes the same reading module 50 as that installed on the carriage 61, the effects of the above (1) to (4) can be similarly obtained also by the reading unit 51.

Second Embodiment

Figure 9:
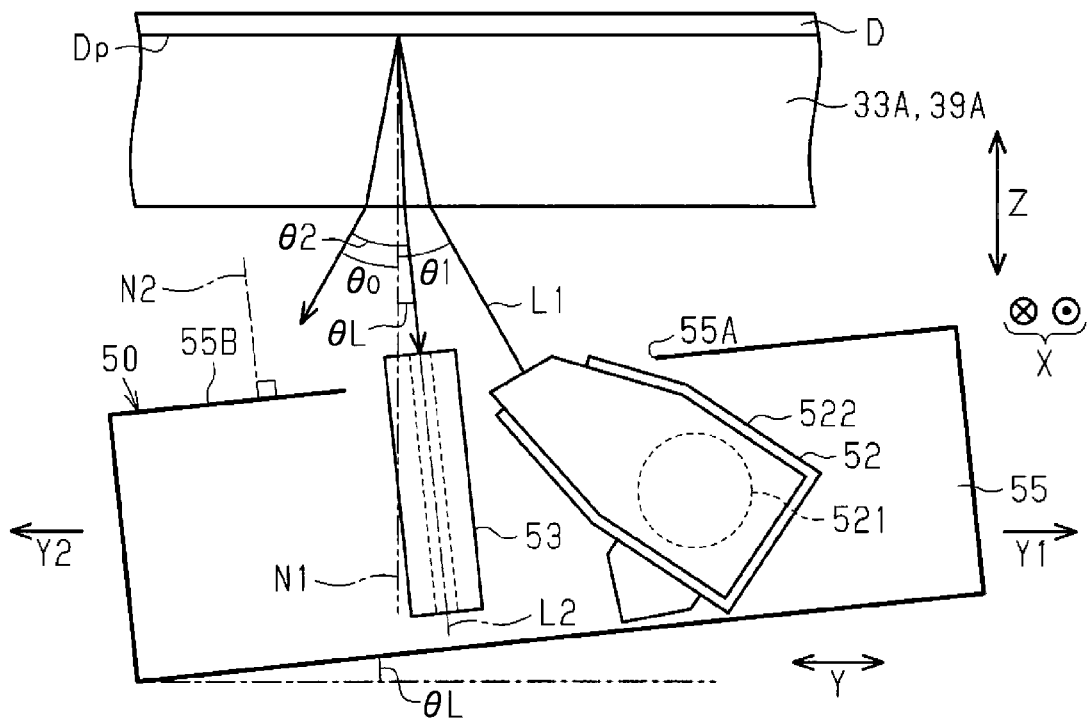
FIG. 9 is a schematic side view illustrating a schematic configuration of a reading module according to a second embodiment.

Next, a second embodiment will be described with reference to FIG. 9. In this second embodiment, by inclining the reading module 50 with respect to the housing 55, the optical axis L2 of the reading element 53 (that is, the image forming element 56) is inclined with respect to the normal line N1 of the glass plates 33A and 39A (that is, the reading surface Dp) by the second angle θL toward the side (counterclockwise direction in FIG. 9) where the incident angle θ1 of the light from the linear light source 52 to the glass plates 33A and 39A is increased. As described above, since the housing 55 is inclined as a whole, the image forming element 56 is disposed such that the optical axis L2 thereof is along the normal line N2 of the facing surface 55B facing the glass plates 33A and 39A of the housing 55. Here, the optical path length from the document D to the incident port of the image forming element 56 (that is, the lens array 562) constituting the reading element 53 is set to the focal length of the plurality of lenses 561 constituting the lens array 562. Therefore, an image of the document surface Dp is formed on the surface of the light receiving element 57. According to the configuration of the present embodiment, it is possible to prevent a gradation shift in the case of the document D made of a glossy medium such as glossy paper is read by inclining the housing 55 with the reading module 50. The same effect can be obtained in a case where the document D (document surface Dp) being transported by the document transport unit 35 is applied to the reading unit 51 illustrated in FIG. 3 which can read the document D.

According to the second embodiment, the following effects can be obtained.

(5) The reading module 50 includes the housing 55 that accommodates the linear light source 52, the image forming element 56, and the light receiving element 57. The housing 55 has the facing surface 55B that faces the glass plates 33A and 39A, and the optical axis L2 of the image forming element 56 is disposed along the normal direction of the facing surface 55B. The Lambert scattered reflected light can be made incident on the image forming element 56 with a relatively simple configuration that the image forming element 56 is inclined to the housing 55 in such a state that the optical axis L2 of the image forming element 56 is inclined by the second angle θL from the normal direction Z of the facing surface 55B of the housing 55. Therefore, even if the document D is a glossy medium, deterioration in the image quality of the read image can be suppressed.

Third Embodiment

Next, a third embodiment will be described with reference to FIG. 10. In the third embodiment, the reading element 53 is configured so that the angle can be adjusted.

Figure 10:
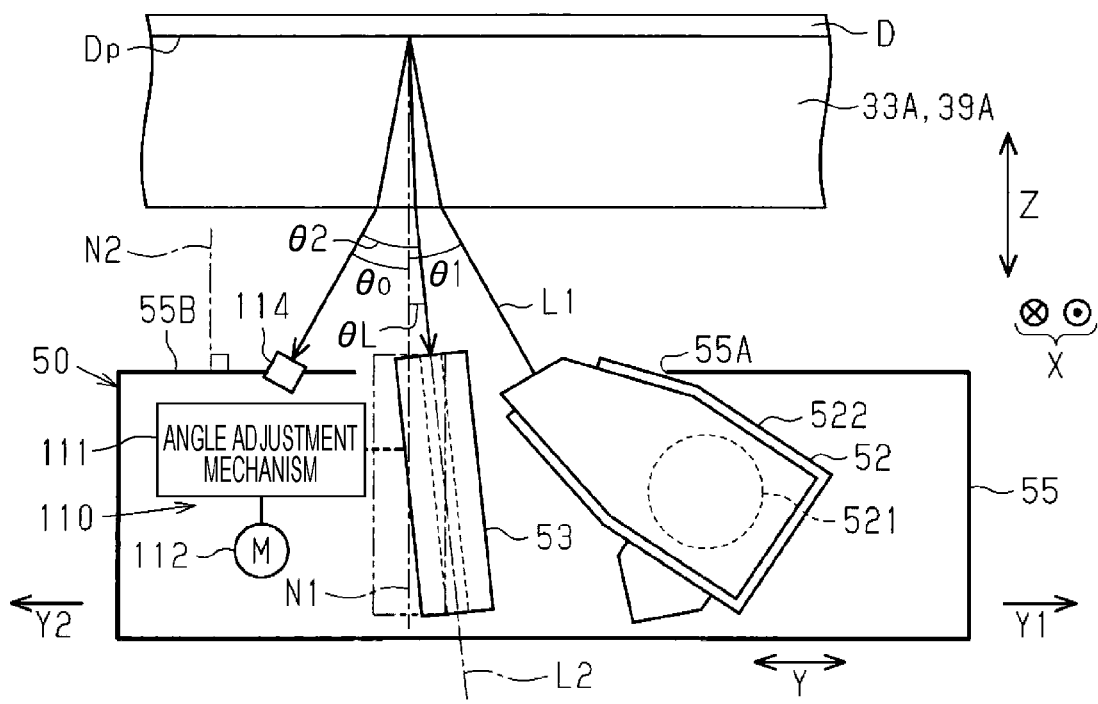
FIG. 10 is a schematic side view illustrating a schematic configuration of a reading module according to a third embodiment.

As illustrated in FIG. 10, the reading module 50 includes an angle adjusting unit 110 for adjusting the inclination angle defined by the angle formed between the optical axis L2 of the reading element 53 and the normal line N1 of the document surface Dp. The angle adjusting unit 110 includes an angle adjustment mechanism 111 capable of adjusting the incline angle of the reading element 53, and an actuator 112 such as an electric motor for giving power for changing the inclination angle of the reading element 53 to the angle adjustment mechanism 111. The angle adjustment mechanism 111 supports the reading element 53 from both sides in the longitudinal direction of the reading element 53 in a state in which the inclination angle thereof can be changed. The angle adjustment mechanism 111 is configured so that the angle can be adjusted such that the optical path length from the document D to the incident port of the image forming element 56 (that is, the lens array 562) becomes the focal length of the plurality of lenses 561 constituting the lens array 562. The actuator 112 as the power source of the angle adjusting unit 110 is not limited to an electric motor, but may be a solenoid, a cylinder, a piezoelectric actuator, or the like.

The actuator 112 illustrated in FIG. 10 is electrically connected to the control unit 90 illustrated in FIG. 8, and the control unit 90 (for example, reading control unit 95) drives and controls the actuator 112, such that the inclination angle of the reading element 53 is adjusted. As described above, in the third embodiment, the second angle θL which is an angle formed by the optical axis L2 of the reading element 53 with respect to the normal line N1 can be changed by changing the attitude angle with respect to the housing 55 of the reading element 53 via the angle adjustment mechanism 111 by the power of the actuator 112.

As illustrated in FIG. 8, the scanner device 31 includes a medium type acquisition unit 113 indicated by a two-dot chain line in FIG. 8 capable of acquiring the medium type (for example, paper type) of the document D. The control unit 90 changes the reading element 53 (image forming element 56) to the second angle θL according to the medium type based on the medium type (for example, paper type) acquired by the medium type acquisition unit 113.

The medium type acquisition unit 113 determines the medium type by at least one of the following three methods.

In a first example of the medium type acquisition unit 113, the medium type of the document D is determined based on the medium type information (for example, paper type information) acquired from a driver 201 of the host device 200 or from the scan job accepted by the input of the operation unit 15. For example, when instructing scanning to the multi-function peripheral 11, the user inputs the medium type of the document D to be read by operating an input device (not illustrated) of the host device 200. When the user operates the input device to instruct the scan, the driver 201 sends the scan job with the medium type information to the multi-function peripheral 11. When the user operates the operation unit 15 of the multi-function peripheral 11 to input the medium type of the document D to be read and instructs the multi-function peripheral 11 to scan by operating the operation unit 15, the control unit 90 in the multi-function peripheral 11 accepts the scan job with the medium type information. When the user instructs to copy the document D, the same scan job is sent to the control unit 90. The medium type acquisition unit 113 acquires the medium type based on the medium type information accepted by the control unit 90.

In a second example of the medium type acquisition unit 113, an optical sensor 114 (dedicated sensor) dedicated to acquisition of the medium type illustrated in FIG. 10 is provided in the reading module 50. The medium type acquisition unit 113 detects the reflection state of the document D to be read by the optical sensor 114 and determines the medium type of the document D based on the detection result. In a case where the document D to be read is a glossy medium, the optical sensor 114 is disposed at a position where light incident on the glass plates 33A and 39A from the linear light source 52 can receive the regularly reflected light reflected by the document surface Dp. The optical sensor 114 outputs a detection signal of a voltage value corresponding to the amount of received light of the reflected light incident from the document D to the control unit 90. In a case where the document D to be read is a glossy medium, the control unit 90 inputs a detection value corresponding to the amount of received light when receiving the regularly reflected light or the Gaussian scattered reflected light from the glossy medium from the optical sensor 114. In the case where the medium is not a glossy medium (in the case of a non-glossy medium), the control unit 90 inputs a detection value corresponding to the amount of light received when receiving the Lambert scattered reflected light from the non-glossy medium from the optical sensor 114. The medium type acquisition unit 113 illustrated in FIG. 8 determines the medium type according to the detection value input from the optical sensor 114. The medium type acquisition unit determines a plurality of medium types including at least three types of glossy media (for example, glossy paper), semi-glossy media (for example, semi-glossy paper), and non-glossy media (for example, plain paper).

In the third example of the medium type acquisition unit 113, the reflection state of the document D to be read is detected by using the reading module 50, and the medium type of the document D is determined from the detection result. In the present embodiment, since the reading element 53 has a configuration capable of adjusting the angle, for example, the reading element 53 (that is, the image forming element 56) at the time of determining the medium type is disposed in an attitude ($\theta L=0$) parallel to the normal direction Z of the glass plates 33A and 39A, reflects the light from the linear light source 52 (that is, the light guide 522) to the document D, and receives the reflected light by the reading element 53. At this time, if the document D to be read is a non-glossy medium such as plain paper or the like, since the scattered reflected light in the Lambert scattering region LR is received, the reading element 53 receives the light having a brightness less than the threshold. On the other hand, if the document D to be read is a glossy medium such as a glossy paper or a semi-glossy paper, since the scattered reflected light of the Gaussian scattering region GR is received, the reading element 53 receives excessively bright light equal to or larger than the threshold value. The medium type acquisition unit 113 determines at least three or more types of a plurality of the medium types (for example, paper type) of the document D according to the amount of light received by the reading element 53 (that is, the light receiving element 57).

In this way, when the medium type acquisition unit 113 acquires the medium type of the document D to be read, the control unit 90 drives the actuator 112 as necessary and adjusts the reading element 53 to the second angle $\theta L$ corresponding to the medium type of the document D. Therefore, if the document D is a glossy paper, the reading element 53 (image forming element 56) is adjusted to a relatively large second angle $\theta L$ (for example, $\theta L=7°$), and if the document D is a semi-glossy paper, the reading element 53 is adjusted to a second angle $\theta L$ (for example, $\theta L=5°$) of medium size. As a result, the Lambert scattered reflected light is incident on the reading element 53 as incident light while avoiding the Gaussian scattered reflected light. If the document D is a non-glossy medium, the reading element 53 (image forming element 56) is adjusted to a relatively small second angle $\theta L$ (for example, $\theta L=0°$) and the Lambert scattered reflected light is incident on the reading element 53 as incident light and the brightness of the incident light to the reading element 53 at this time is secured. The above configuration may be applied to the reading module 50 of the reading unit 51 illustrated in FIG. 3 capable of reading the document D (document surface Dp) during the transport by the document transport unit 35.

According to the third embodiment, the following effects can be obtained.

(6) The image reading apparatus further includes the medium type acquisition unit 113 that acquires the medium type of the document D and changes the second angle $\theta L$ according to the medium type. Therefore, since the second angle $\theta L$ is changed according to the medium type acquired by the medium type acquisition unit 113, in a case where the document D is a glossy medium, it is possible to suppress degradation in the image quality of the read image, and in a case where the document D is a non-glossy medium, it is possible to suppress reduction in the brightness (received light amount) of the incident light due to the inclination of the image forming element 56 and degradation in resolution due to the document floating. Therefore, regardless of the medium type of the document D, it is possible to acquire a read image with good image quality.

(7) The medium type acquisition unit 113 acquires the medium type from at least one method of acquiring the medium type based on the medium type information input through the input unit 94, determining the medium type based on the reflection state of the document D detected by dedicated sensor, or determining the medium type based on the reflection state of the document D detected by the reading module 50. Therefore, it is possible to obtain the medium type of the document D by a relatively simple method. The same effect can be obtained in a case where the document D (document surface Dp) being transported by the document transport unit 35 is applied to the reading unit 51 illustrated in FIG. 3 capable of reading.

Fourth Embodiment

Next, a fourth embodiment will be described with reference to FIG. 11. In the fourth embodiment, the reading element 53 is configured to be able to adjust the angle by inclining with respect to the housing 55 as a whole.

Figure 11:
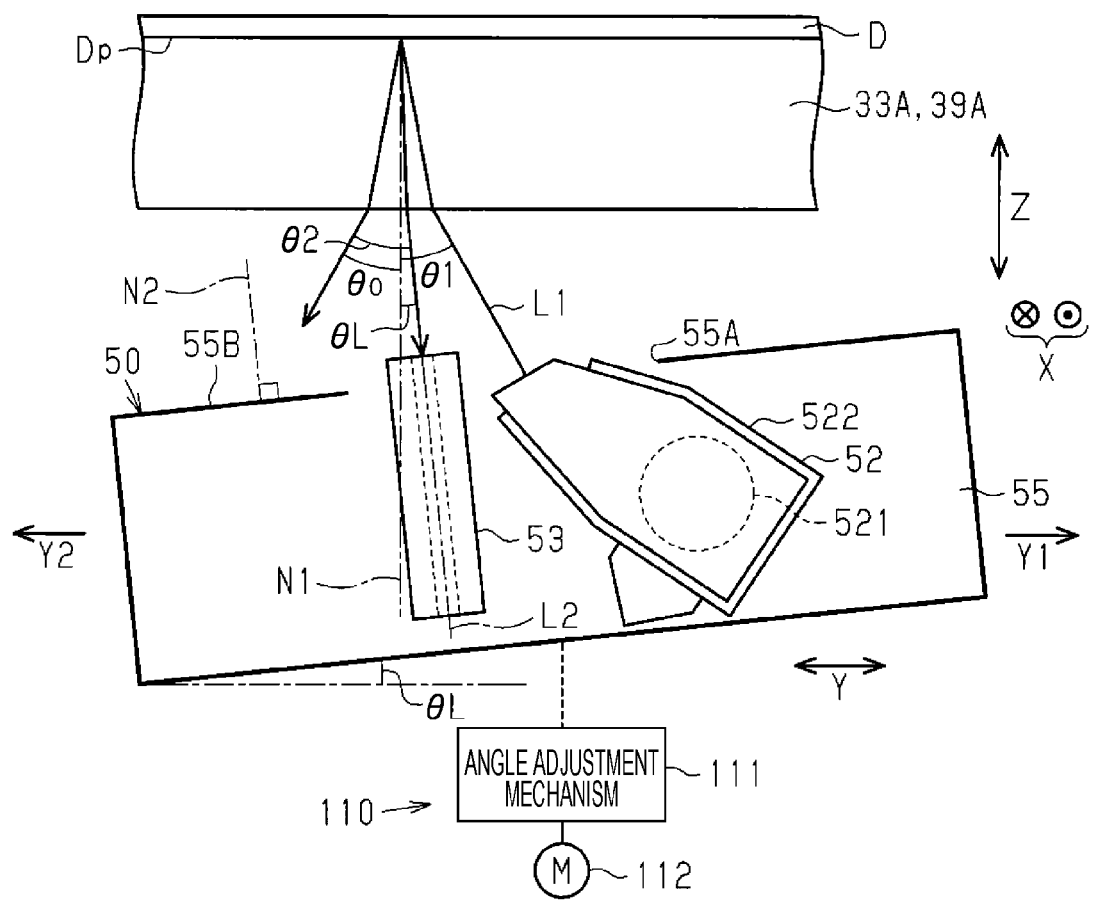
FIG. 11 is a schematic side view illustrating a schematic configuration of a reading module according to a fourth embodiment.

As illustrated in FIG. 11, the reading module 50 is configured to be capable of inclining the housing 55 that accommodates the linear light source 52 and the reading element 53 as a whole about a rotation axis parallel to the main scanning direction X. The scanner device 31 includes the angle adjusting unit 110 for adjusting the incline angle θL of the housing 55 so that the second angle θL defined by the angle formed by the optical axis L2 of the reading element 53 and the normal line N1 of the document surface Dp can be adjusted. The angle adjusting unit 110 includes the angle adjustment mechanism 111 capable of adjusting the inclination angle θL of the housing 55 and the actuator 112 such as an electric motor for giving power for inclining the housing 55 to the angle adjustment mechanism 111. The angle adjustment mechanism 111 supports the housing 55 in a state in which the inclination angle θL can be changed from both sides in the longitudinal direction thereof. The angle adjustment mechanism 111 adjusts the angle of the housing 55 to satisfy a condition that the optical path length from the document D to the incident port of the image forming element 56 (that is, the lens array 562) coincides with the focal length of the plurality of lenses 561 constituting the lens array 562.

As illustrated in FIG. 8, similarly to the third embodiment, the control unit 90 has a medium type acquisition unit 113 indicated by a two-dot chain line in FIG. 8. When the medium type acquisition unit 113 acquires the medium type of the document D to be read, the control unit 90 drives the actuator 112 as necessary and inclines the reading module 50 with the housing 55 as a whole, thereby adjusts the reading element 53 to the second angle θL corresponding to the medium type of the document D. Therefore, even if the document D is a glossy medium, the Lambert scattered reflected light can be made incident on the reading element 53 by avoiding the Gaussian scattered reflected light. If the document D is a non-glossy medium, the inclination angle θL of the housing 55 is adjusted to 0 degrees, for example, so that the second angle θL is adjusted to, for example, 0 degrees (θL=0°). Therefore, the Lambert scattered reflected light is incident on the reading element 53, and white floating or the like is suppressed, and the brightness of the incident light to the reading element 53 and the resolution in the case of a document floating are secured. The above configuration may be applied to the reading module 50 of the reading unit 51 illustrated in FIG. 3 for reading the document D being transported.

According to the fourth embodiment, the effects (6) and (7) in the third embodiment can be similarly obtained, and the following effects can be obtained.

(8) Since the image forming element 56 is inclined with the housing 55 as a whole, the reading element 53 (image forming element 56) can be firmly fixed to the housing 55. Since the reading element 53 is sensitive to distortion, if the reading element 53 is supported so as to be inclinable with respect to the housing 55 as in the configuration of the third embodiment, it is worried that image forming accuracy of the reading element 53 will be reduced due to distortion. On the other hand, in the fourth embodiment, since the reading element 53 can be firmly fixed to the housing 55, compared to the configuration of the third embodiment, it is possible to suppress the image forming accuracy of the image forming element 56 reduced due to the influence of distortion. Therefore, a good read image can be acquired.

The above embodiment can be changed to the following embodiment.

In each of the above-described embodiments, the magnitude relation between the second angle θL and the first angle θ1 is θL<θ1, but may be θL≥θ1. As long as the Lambert scattered reflected light can be incident on the image forming element 56, for example, θL may be equal to θ1 or θL may be larger than θ1.

Both the configuration in which the reading element 53 in the first embodiment is inclined with respect to the housing 55 and the configuration in which the housing 55 as a whole is inclined with respect to the normal direction Z in the second embodiment may be applied. In other words, the reading element 53 may be inclined at the second angle θL in the same direction as the linear light source 52 with respect to the normal direction Z.

In the third embodiment, the second angle θL was changed according to the medium type, but the second angle θL may be changed in accordance with the detection result that causes the dedicated optical sensor 114 (dedicated sensor) or the reading module 50 to detect the reflection state of the white document (white medium). According to this configuration, even if the assembly of the linear light source 52 and the brightness vary, the Lambert scattered reflected light can be made incident on the reading element 53 (image forming element 56) by avoiding the Gaussian scattered reflected light.

The reading element 53 is not limited to CISM, but may be a reading element of a reduction optical system such as a charge coupled device (CCD) image sensor, for example.

In a case where the reading element 53 is a CISM, the lenses constituting the image forming element are not limited to the SLA and may be a microlens array.

The light guide 522 constituting the linear light source 52 is not limited to the configuration illustrated in FIG. 4, and may be anything as long as it can uniformly illuminate the document D. For example, the light guide may have a configuration in which a plurality of fiber bundles are bundled and assembled.

The linear light source 52 is not limited to a system using the light emitting body 521 and the light guide 522. The linear light source 52 may be, for example, a linear light emitting body.

The light emitting body 521 is not limited to an LED, and a fluorescent lamp such as a xenon lamp may be used.

The image reading apparatus is not limited to a multifunction peripheral including a scanner device, and may be a copying machine including with a scanner device. Further, the image reading apparatus may be a scanner device including a document transport unit (ADF device), or may be a flatbed type scanner device.

What is claimed is:

1. An image reading apparatus comprising:
a transparent member that defines a position of a document;
a reading module that is disposed on an opposite side of the document with respect to the transparent member; and
a transport unit that relatively moves the document and the reading module, wherein the reading module includes
a linear light source that extends in a direction intersecting a moving direction in which the transport unit relatively moves and irradiates the document with light via the transparent member,
an image forming element that is disposed along an extending direction of the linear light source and condenses the light reflected from the document, and
a light receiving element that is disposed along an extending direction of the image forming element, and receives the light condensed by the image forming element,
wherein the linear light source is disposed such that a main optical axis of the linear light source, directly from the linear light source to the transparent member, is inclined at a first angle with respect to a normal direction of the transparent member in the moving direction, and
wherein the image forming element is disposed such that an optical axis of the image forming element, extending directly from the transparent member to the image forming element, is directed to a position where the light reflected from a reading position of the document is emitted from the transparent member, and is inclined at a second angle in the same direction as the inclination of the main optical axis of the linear light source with respect to the normal direction.

2. The image reading apparatus according to claim 1, wherein the second angle is smaller than the first angle.

3. The image reading apparatus according to claim 1, wherein the reading module includes a housing that accommodates the linear light source, the image forming element, and the light receiving element, the housing has a facing surface that faces the transparent member, and the optical axis of the image forming element is inclined at the second angle from a normal direction of the facing surface.

4. The image reading apparatus according to claim 1, wherein the reading module includes a housing that accommodates the linear light source, the image forming element, and the light receiving element, the housing has a facing surface that faces the transparent member, and the optical axis of the image forming element is disposed along a normal direction of the facing surface.

5. The image reading apparatus according to claim 1, wherein, in a case where the document is a glossy medium, the second angle is set to an angle at which the image forming element receives scattered reflected light from a Lambert scattering region by avoiding a scattered reflected light from a Gaussian scattering region in the reflected light from the document.

6. The image reading apparatus according to claim 1, further comprising:
a medium type acquisition unit that acquires a medium type of the document,
wherein the second angle is changed according to the medium type.

7. The image reading apparatus according to claim 6, wherein the medium type acquisition unit acquires the medium type from any one of acquiring the medium type based on medium type information input through an input unit, determining the medium type based on a reflection state of the document detected by a dedicated sensor, or determining the medium type based on a reflection state of the document detected by the reading module.

8. A reading module comprising:
a linear light source that extends in a predetermined direction and irradiates a document with light;
an image forming element that is disposed along an extending direction of the linear light source, and condenses light reflected from the document;
a light receiving element that is disposed along an extending direction of the image forming element, and receives the light condensed by the image forming element; and
a housing that has a facing surface that faces the document, and accommodates the linear light source, the image forming element, and the light receiving element,
wherein the linear light source is disposed such that a main optical axis of the linear light source, directly from the linear light source to a transparent member supporting the document, is inclined at a first angle with respect to a normal direction of the facing surface in the predetermined direction, and
wherein the image forming element is disposed such that an optical axis of the image forming element, extending directly from the transparent member to the image forming element, is inclined at a second angle in the same direction as the inclination of the main optical axis of the linear light source with respect to the facing surface.

9. An image reading apparatus comprising:
a transparent member that defines a position of a document;
a reading module that is disposed on an opposite side of the document with respect to the transparent member; and
a transport unit that relatively moves the document and the reading module,
wherein the reading module includes
a linear light source that extends in a direction intersecting a moving direction in which the transport unit relatively moves and irradiates the document with light via the transparent member,
an image forming element that is disposed along an extending direction of the linear light source and condenses the light reflected from the document, and
a light receiving element that is disposed along an extending direction of the image forming element, and receives the light condensed by the image forming element,
wherein the linear light source is disposed such that a main optical axis of the linear light source is inclined at a first angle with respect to a normal direction of the transparent member in the moving direction,
wherein the image forming element is disposed such that an optical axis of the image forming element is directed to a position where the light reflected from a reading position of the document is emitted from the transparent member, and is inclined at a second angle in the same direction as the inclination of the main optical axis of the linear light source with respect to the normal direction, and
wherein when viewed from the extending direction of the image forming element, the linear light source and the image forming element are arranged at positions overlapping each other in the optical axis direction of the image forming element.

* * * * *